(12) United States Patent
Srivastava

(10) Patent No.: US 12,405,965 B2
(45) Date of Patent: Sep. 2, 2025

(54) SYSTEMS AND METHODS FOR HOME LENDING DATA CONTROL

(71) Applicant: Wells Fargo Bank, N.A., San Francisco, CA (US)

(72) Inventor: Purshartha Chandra Srivastava, Waxhaw, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/535,756

(22) Filed: Dec. 11, 2023

(65) Prior Publication Data

US 2025/0190443 A1 Jun. 12, 2025

(51) Int. Cl.
*G06F 16/25* (2019.01)
*G06F 16/22* (2019.01)

(52) U.S. Cl.
CPC ........ *G06F 16/254* (2019.01); *G06F 16/2282* (2019.01)

(58) Field of Classification Search
CPC ............................ G06F 16/254; G06F 16/2282
USPC ......................................... 707/602, 741, 756
See application file for complete search history.

(56) References Cited

U.S. PATENT DOCUMENTS

| | | | |
|---|---|---|---|
| 7,401,134 B2 * | 7/2008 | Velez | .................... H04L 1/0025 370/218 |
| 7,671,873 B1 * | 3/2010 | Pierini | ..................... G06F 3/14 345/603 |
| 11,528,636 B2 | 12/2022 | Mishra et al. | |
| 2002/0080828 A1 * | 6/2002 | Ofek | ....................... H04L 49/55 370/539 |
| 2006/0168290 A1 * | 7/2006 | Doron | ................ H04N 21/6582 709/231 |
| 2020/0026735 A1 | 1/2020 | Przada et al. | |
| 2020/0285977 A1 | 9/2020 | Brebner | |
| 2021/0073240 A1 * | 3/2021 | Almaraz | ............... G06F 16/273 |
| 2021/0118054 A1 | 4/2021 | Turner et al. | |
| 2021/0303936 A1 * | 9/2021 | Bichler | ................. G06F 18/214 |
| 2022/0011945 A1 | 1/2022 | Coleman et al. | |
| 2022/0414766 A1 | 12/2022 | Miroshnikov et al. | |

(Continued)

FOREIGN PATENT DOCUMENTS

EP 3623961 3/2020

*Primary Examiner* — Phong H Nguyen
(74) *Attorney, Agent, or Firm* — SCHWEGMAN LUNDBERG & WOESSNER, P.A.

(57) ABSTRACT

Various examples are directed to computer-implemented systems and methods for providing a home lending data control product. A method includes receiving data from one or more data sources, and constructing a configuration framework for ingesting, conforming and curation of data processing of the received data. Confirmation of receipt and correct format of the data is provided based on the configuration framework. The method also includes determining that the data has not been modified in transit, and confirming that the data is from a proper timeframe based on a file header or content of the data. The method further includes determining that the data has not been previously processed based on a comparison with previously processed data, transforming a format of the data based on the configuration framework and based on the one or more data sources, and storing the data in a data lake configured for centralized processing.

20 Claims, 9 Drawing Sheets

(56) References Cited

U.S. PATENT DOCUMENTS

2023/0177029 A1  6/2023  David et al.
2023/0222416 A1  7/2023  Slavin et al.
2024/0126756 A1* 4/2024  Schmidt ................ G06N 3/044

* cited by examiner

```
150 ─┐
    │
    ├─ 152: Receive data from one or more data sources
    │
    ├─ 154: Construct a configuration framework for ingesting and conforming the data
    │
    ├─ 156: Use the framework for monitoring incoming data
    │
    ├─ 158: Use the framework for transforming format of the data
    │
    └─ 160: Storing the transformed data for centralized processing
```

FIG. 1B

SYSTEMS AND METHODS FOR HOME LENDING DATA CONTROL

TECHNICAL FIELD

This document relates generally to computer systems and more particularly to systems and methods for a home lending data control product.

BACKGROUND

Various sources of data may be used to provide input for institutional decision making. These data sources may be structured or unstructured and may have compatibility issues with each other and with common data repositories. Financial data in particular may be subjected to heightened security and data governance requirements. Applications that use financial data from disparate sources may have difficulty with incoming data control and assimilation. Improved systems and methods for home lending data control are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 1B illustrates an example embodiment of a method for home lending data control, according to various embodiments;

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Multiple sources of data may be used to provide input for institutional decision making. These data sources may be structured or unstructured and may have compatibility issues with each other and with common data repositories. Financial data in particular may be subjected to heightened security and data governance requirements. Applications that use financial data from disparate sources may have difficulty with incoming data control and assimilation. Improved systems and methods for home lending data control are needed.

The present subject matter provides systems and methods for home lending data control, according to various embodiments. The present systems and methods are demonstrated with home lending data, but may be used for any situation in which multiple input data sources are used or received and assimilated using a common mode or data repository.

Figure 1A:
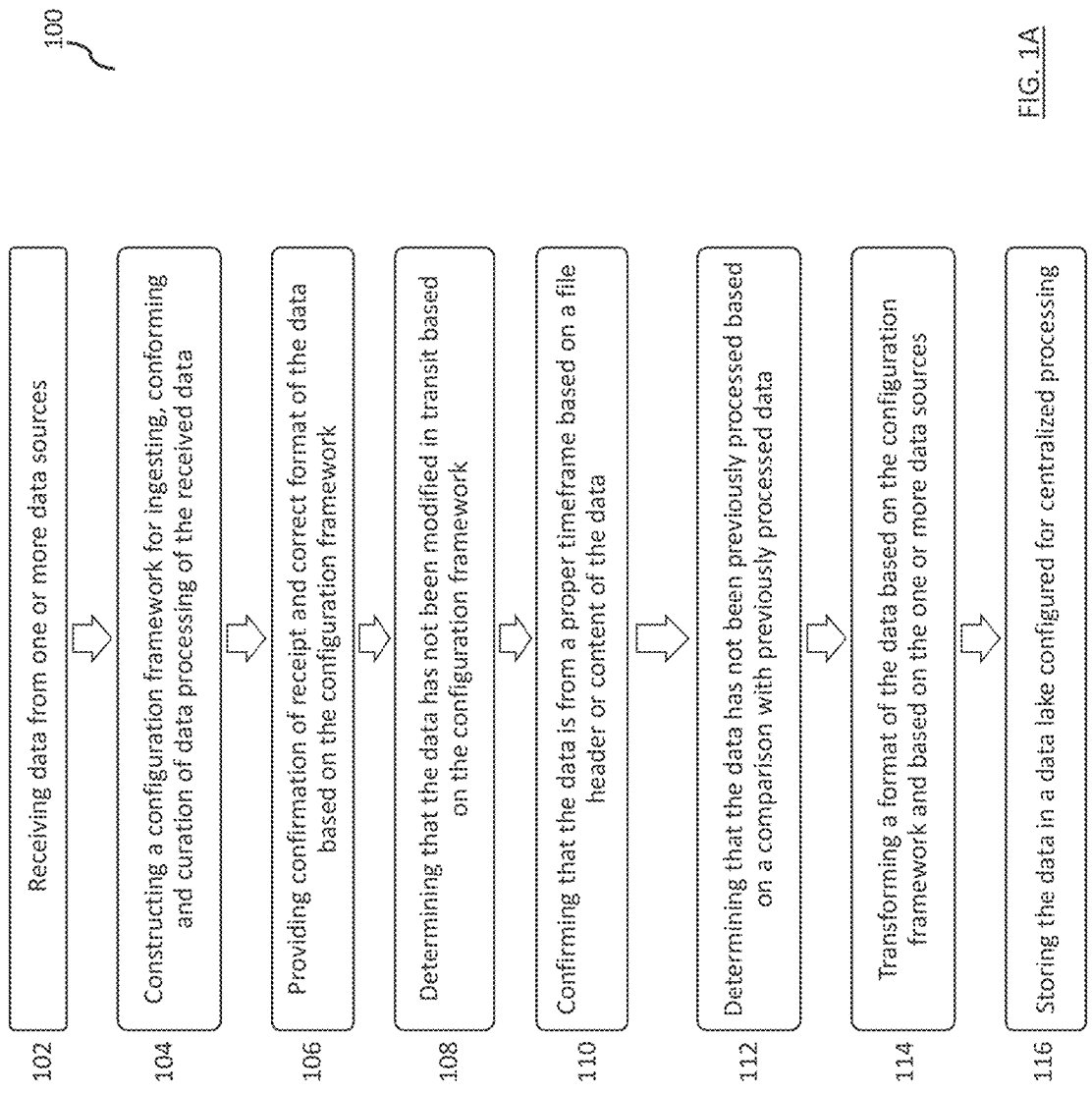
FIG. 1A illustrates an example embodiment of a method for a home lending data control product, according to various embodiments.

FIG. 1A illustrates an example embodiment of a computer-implemented method for a home lending data control product, according to various embodiments. The method 100 includes receiving data from one or more data sources, at step 102, and constructing a configuration framework for ingesting, conforming and curation of data processing of the received data, at step 104. In various embodiments, constructing a configuration framework includes translating instructions for processing of received data into multiple executable code segments referred to as properties, and then calling the properties to execute when needed. These properties are independent executables which can be enabled or disabled on demand and are generic in nature, in various embodiments. When these properties (or executables) are executed in the order defined in FIG. 1A, it may be referred to as a configurational framework, in an embodiment.

Confirmation of receipt and correct format of the data is provided based on the configuration framework, at step 106. Examples include using one or more controls that are programmable to evaluate the data and provide feedback based on the evaluation. The method 100 also includes determining that the data has not been modified in transit, at step 108, and confirming that the data is from a proper timeframe based on a file header or content of the data, at step 110. In one example, the present system provides the one or more controls, such as for validating and confirming volume and timing of incoming data. The method 100 further includes determining that the data has not been previously processed based on a comparison with previously processed data, at step 112, transforming a format of the data based on the configuration framework and based on the one or more data sources, at step 114, and storing the data in a data lake configured for centralized processing, at step 116.

According to various embodiments, transforming the format of the data includes loading data from a database table using filters. In one embodiment, a property (or executable) may be coded generically and receive an input from a user in the form of a configuration which will hold filter conditions (for example, employee number=22). After receiving the input, the configuration generic executable uses the input to retrieve data to be integrated as an embedded body in the executable, according to various embodiments.

Transforming the format of the data includes loading data from a database table and applying multiple data transformation rules, in some embodiments. In various examples, transforming the format of the data includes loading data from multiple sources and performing a join operation based at least in part on the configuration framework. Transforming the format of the data includes masking the data based on a configuration rule and moving the data within different data environments, in various examples. The configuration framework is configured to provide real-time data processing and batch data processing, in various embodiments.

According to various embodiments, the configuration framework is configured to process multiple data feeds without changes to underlying code. As shown in FIG. 1A, the present subject matter uses different configurations which are set up per data feed. Once the configurations are set up they are executed sequentially based on the data feed and new code does not need to be generated. In one example, an underlying interpreter reads the configuration and issues a command to execute the instructions based on the configuration. The configuration framework is configured to provide extended metadata for processed data, in various examples. In various embodiments, the configuration framework is configured to integrate into a plurality of data channels.

FIG. 1B illustrates an example embodiment of a method for home lending data control, according to various embodiments. The method 150 includes receiving data from one or more data sources, such as databases or data streams, at step 152, and constructing a configuration framework for ingesting and conforming the data, at step 154. At step 156, the framework is used for monitoring incoming data. The framework is also used for transforming the format of the data, at step 158. At step 160, the transformed data is stored for centralized processing.

In various embodiments, the present system provides a plurality of controls for processing incoming data. For example, in one embodiment a control includes a control for confirmation of data file or feed receipt. The objective of this control is to provide confirmation that the application received the correct data file or feed. This control ensures completeness of the received data. In one example of this control, an application is expected to receive 10 files and receives 1 file less due to an incorrect name, incorrect directory, or due to delay based on a service level agreement (SLA) for example, and then the resulting value of this control or metric is 90%. The control may be programmed with an expected number to receive by a certain time, and in this example the configuration may be set to expect 10 data files (or feeds) to be received by 12:00 am.

In another embodiment, a control provided by the present system includes an empty file check. The objective of this control is to confirm that a received data file is not empty. This control ensures completeness of the received data. In one example of this control, an application receives 2 empty file feeds out of the total 10 files received, then the value of this metric is 80%.

In one embodiment, a control provided by the present system includes a data volume check. The objective of this control is to check if a number of received records are correct. This control ensures completeness of the received data. One example of this control uses a file header or trailer record to confirm if the number of received records match the number expected. In various embodiments, the data volume check control applies whether data is from a file or feed, or if data is pulled from a source.

In another embodiment, a control provided by the present system includes a data load check. The objective of this control is to ensure data has not been modified in transit. This control provides a reconciliation between data from source to target (ingestion→standardization→conformance-→published area) at the file/feed level. The data load check control ensures that partial or incomplete files are not loaded, thus ensuring completeness of the received data. In one example of this control, an application reconciles that the number of records processed equals the number of records delivered. If an input file has an indicator in each row for new/change/delete, then the data staging process confirms that the net number of inserts/updates/deletes are in sync, in one embodiment.

In another example, a control provided by the present system includes a data volume consistency check. The objective of this control is to check that the number of records received in a current time period compared to the number of records received in a prior period are within expected tolerance (e.g., minimum, maximum, and median). This control ensures consistency of the received data. In various examples of this control, the present system performs a physical file size check of current to prior time periods, logs files with header/trailers, and performs a checksum comparison across files between time periods.

In one example, a control provided by the present system includes a delivery check. The objective of this control is to provide confirmation of the actual delivery time when the file/feed is delivered versus the SLA for the file/feed. This control ensures timeliness of the received data. In various examples of this control, the present system ensures that the date should be a 'work of date'. For example, the file date may be today's date and the business date is yesterday's date. If the file date is the same as the business date, then the present system only implements one control to compare the date to the header file or file content.

In another example, a control provided by the present system includes a file date check. The objective of this control is to confirm the file date (which may be different than business date), by checking versus the header file or file content. This control ensures timeliness of the received data. In various examples of this control, the present system checks to determine if the file date present as part of the file name matches with the header date on the file, and if not the control provides notification of a file date error.

In one example, a control provided by the present system includes a business date check. The objective of this control is to confirm the business date (date the data content is for) of the data content, by checking versus header file or file content. This control ensures validity of the received data. In various examples of this control, the present system checks whether the header date present as part of the file name matches with the date in the file contents, and if not the control provides notification of a business date error.

In another example, a control provided by the present system includes a duplicate file load check. The objective of this control is to validate that the file/feed is unique and is processed only once for the application. This control ensures uniqueness of the received data. In various examples of this control, the present system performs a checksum comparison across multiple files, and provides a notification of a duplicate file load is detected.

In another embodiment, a control provided by the present system includes a physical data element format check. The objective of this control is to validate the physical data element format for received data. This control ensures validity of the received data. In various examples of this control, the present system checks that the date of the received data is a valid calendar date. In one example, the control checks that the date follows a standard format, such as mm/dd/yyyy or dd/mm/yyyy. In one example, the control checks that an identification number is no more than a predetermined number (such as 7) of characters long. In another example, the control checks if the identification number begins with a numerical or alphanumerical character.

In various embodiments, the present system provides three categories of data transformations for processing incoming data, to cater to the needs of different applications using the system. A first category is simple data transformations. In one example of a simple data transformation the present system loads the data from a database table with some filters and writes into a target table adding a load timestamp without any data transformations, using a truncate and load option on a target table. In another example of a simple data transformation, the present system loads data from a file/database table and changes the datatypes matching to a target table for the loaded data.

A second category is medium data transformation. In one example of a medium data transformation the present system loads data from a file/table and applies multiple data transformation rules to write the data into a target table. In another example of a medium data transformation, the present system loads the data into a stage table and calculates the delta between the target table and the stage table and applies only delta (insert/update/delete) to the final table.

A third category is complex data transformation. In one example of a complex data transformation the present system loads data into a stage table and calculates the delta between the target table and the stage table and applies only the delta (insert/update/delete) to the final table. In another example of a complex data transformation, the present system loads data from multiple sources and performs a join operation based on certain criteria and loads the result into a target table. In yet another example of a complex data transformation, the present system derives new values from existing column values based on business rules and writes into new columns of a target database.

Various embodiments include a computing system with one or more processors and a data storage system in communication with the one or more processors, wherein the data storage system comprises instructions thereon that, when executed by the one or more processors, causes the one or more processors to execute the steps of the methods of FIGS. 1A-1B. One or more of constructing a configuration framework or transforming a format of the data includes using machine learning, in some embodiments. The machine learning may include a machine learning model including a neural network. The machine learning model may include one or more of a long short-term memory (LSTM) network, bidirectional encoder representations from transformers (BERT), natural language processing (NLP), or an artificial intelligence (AI)-based knowledge tree, in various examples. Other types of machine learning models may be used without departing from the scope of the present subject matter.

Various embodiments include a non-transitory computer-readable storage medium, the non-transitory computer-readable storage medium including instructions that, when executed by computers, cause the computers to perform operations including the methods of FIGS. 1A-1B.

The present subject matter may be used for ingesting data to targets like enterprise data lakes (EDLs), databases (DBs), and Google stores, for example. In some examples, the present system can be hosted on an electronic design automation (EDA) platform. The computation may be done on a Spark platform, in various embodiments. A scripting language, scheduling Autosys, and structured query language (SQL) servers may be leveraged to implement the functionality of the present subject matter. Distribution can be through Hadoop, in one embodiment.

In various embodiments, the present application provides for a home lending data control system that is designed to achieve a plurality of objectives. In one example, the present system provides for high speed and consistent receiving and conforming of data for large batch processing, using one or more controls as indicated above. In various embodiments, the present application may be implemented using a unified analytics engine such as Spark, and using Python or other types of programming language interfaces. The present system provides for development automation and configuration driven development, including providing support for simple and hierarchical data types, including, but not limited to comma-separated values (CSV), database-related (DB), fixed length, extensible markup language (XML), or JavaScript object notation (JSON) types. In one example, FIX messages and XML are nested using a package such as defusedxml (a Python service). In another example, Extended Binary Coded Decimal Interchange Code (EBCIDIC) is parsed using copybooks.

In various embodiments, the present system provides support for batch, mini-batch and real-time use cases, and also may provide custom connector integration as needed (e.g., Java message service (JMS), financial information exchange (FIX), etc.). In some examples, the present system provides for schema evolution, such as column additions and character string length changes, and also may provide for basic change data capture, such as from previous day data.

In another example, the present system provides a technology focused framework to automate ingestion of data to raw data and sanitized data zones, using a minimum data movement controls implementation. Once the configurations are set up as shown in FIG. 1A for the various configurations, the configurations may be enabled for application level processing or feed level processing, and automatic validation begins. The properties/executables are cascading in nature, and set up on application level may flow to feed level, in various examples.

The present system also provides configurable technical rules for data disqualification using one or more controls as indicated above, which may provide for threshold driven data acceptance and rejection, in various embodiments. In some embodiments, the present system provides for configurable and simple data cleansing rules. The data cleansing rules are provided using controls, for example by configuring the controls to filter out any special characters (such as regex("\n") for regular expressions).

The present subject matter provides data movement controls that adhere to enterprise data governance (EDG) policies, in various embodiments. Data movement controls are the technical controls for data in motion for all data that feeds into and out of an application (APP), to be consistent with recommended processing control requirements of the application lifecycle management standards of a technology systems development lifecycle and application lifecycle management standards. Furthermore, the present system meets the minimum required data movement controls for APPs for on-boarding data to an EDL. In various embodiments, APPs are required to produce evidence that required minimum data quality controls have been implemented for each onboarded feed to an EDL.

The present system provides a data ingestion framework and provides a consistent mechanism of ingesting data to an EDL, while complying with the blueprint reference architecture. One of the features of the present framework is to facilitate seamless and consistent implementation of the prescribed minimum data movement controls. In various embodiments, the present system provides for a minimum data movement control implementation for ingestion of batch files. In other embodiments, the system may provide for ingestion of data for messaging, streaming or replication. Other types of data may be used without departing from the scope of the present subject matter. In some embodiments, the present system automatically publishes data quality results and records controls related to inventory information.

The present system for data transformation provides a number of benefits. For example, the present system provides a configuration on top of application flow of data. Previously, data ingestion caused a lack of agility for reaction to business conditions such as a controlled release of a product, causing a wait time for incoming data. The present system defines the functionality needed for rapid data ingestion by configuration of objects that can be calibrated using tools for each application. The provided configuration may be translated on the fly into binaries, interpreted by an engine into the framework, then translated into execution on an application platform. For example, if the framework uses files with a name, place, and address, and a change is desired to add email, the present system may provide for updating the configuration which updates the entire system. In addition, the present subject matter provides support for out-of-box functionality, data profiling, and quality test, both at rest and in motion. Furthermore, the present system can generate any desired metadata for associated data processing.

For example, previously making any change in the code had to go through a standard change management process, which was time consuming and could last weeks or months and was a complicated process that required multiple approvals. Using the framework configurations of the present subject matter, one only has to update the configurations, and the translator interprets the configurations and turns them into executables. This saves time and effort by not requiring manual code edits. In addition, configurations may be set up in any database, files or embedded object, in various embodiments.

The present system provides an event-driven model for live data processing ingestion, such as when a file is in state of validation, providing for event profiling, and each and every stage of the generated event profile can be viewed, which saves time in processing. This saved processing of data ingestion shrinks the cycle from months to hours, potentially saving money with minimal further technical operational input. While the present system may use Java and Python, the upkeep and changes to the configuration of the controls provided by this system do not require knowledge of the underlying syntax, so there is no learning curve for continued seamless data ingestion.

While the present subject matter has been demonstrated using input data received from databases, any data source may be assimilated using the configuration of the present subject matter such as batch, real time or distributed data. In addition, the present system can support output of any type of data, in various embodiments, and may be use case dependent, with outputs to files, databases, fixed messages, scripts, batch, or published data. The present system provides for a software independent framework, which can run on Windows, Linux, Unix, or any other platform. In one embodiment, the base configuration is provided using Spark.

While the present subject matter has been demonstrated using input data for home lending, any other type of input data may be used. For example, a financial institution may use this framework for equity data, substantial capital reports, other reporting needs of the institution, capital market derivatives, fraud prevention, loan applications, or the like. In various examples, the present system ingests data and stores the data in homogeneous sources. The present system may provide one or more user interfaces, in various embodiments, such as graphic displays, custom configurations, spreadsheets, or any other type of user interface may be applied or provided on top of the present configuration. In various examples, the present system uses machine learning such as artificial intelligence to support data ingestion and processing. In some examples, the present system provides a framework with a threshold nature, providing a count and consistency of data, and allows a user to take action based on data consistency checks and comparison to average numbers.

Figure 2:
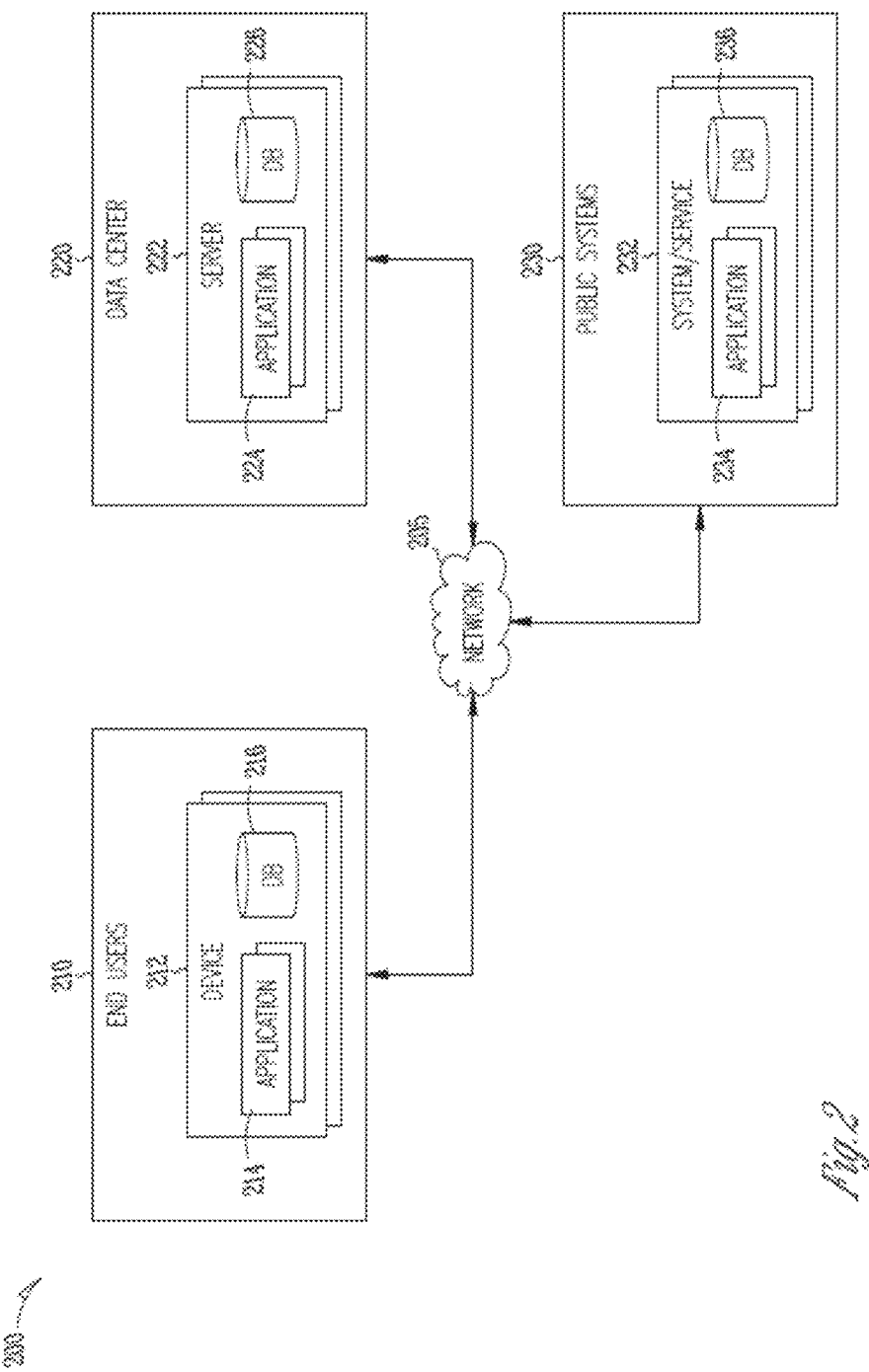
FIG. 2 illustrates an exemplary infrastructure for use in the present subject matter, according to various embodiments.

FIG. 2 illustrates an exemplary infrastructure for providing a system of the present subject matter. The infrastructure may comprise a distributed system 200 including a computing system that may include a client-server architecture or cloud computing system. Distributed system 200 may have one or more end users 210. An end user 210 may have various computing devices 212, which may be a machine 800 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The server 222 or other portions of the distributed system may create and manage the system for a home lending data control product, such as by performing operations including the methods of FIGS. 1A-1B, in various embodiments. The business entity may be a computer service provider, as may be the case for a cloud services provider, or it may be a consumer product or service provider, such as a financial institution. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 800.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 800.

The end-user devices 212, data center servers 222, and public systems or services 232 may be configured to connect with each other via the network 205, and access to the network by machines may be made via a common connection point or different connection points, e.g., a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
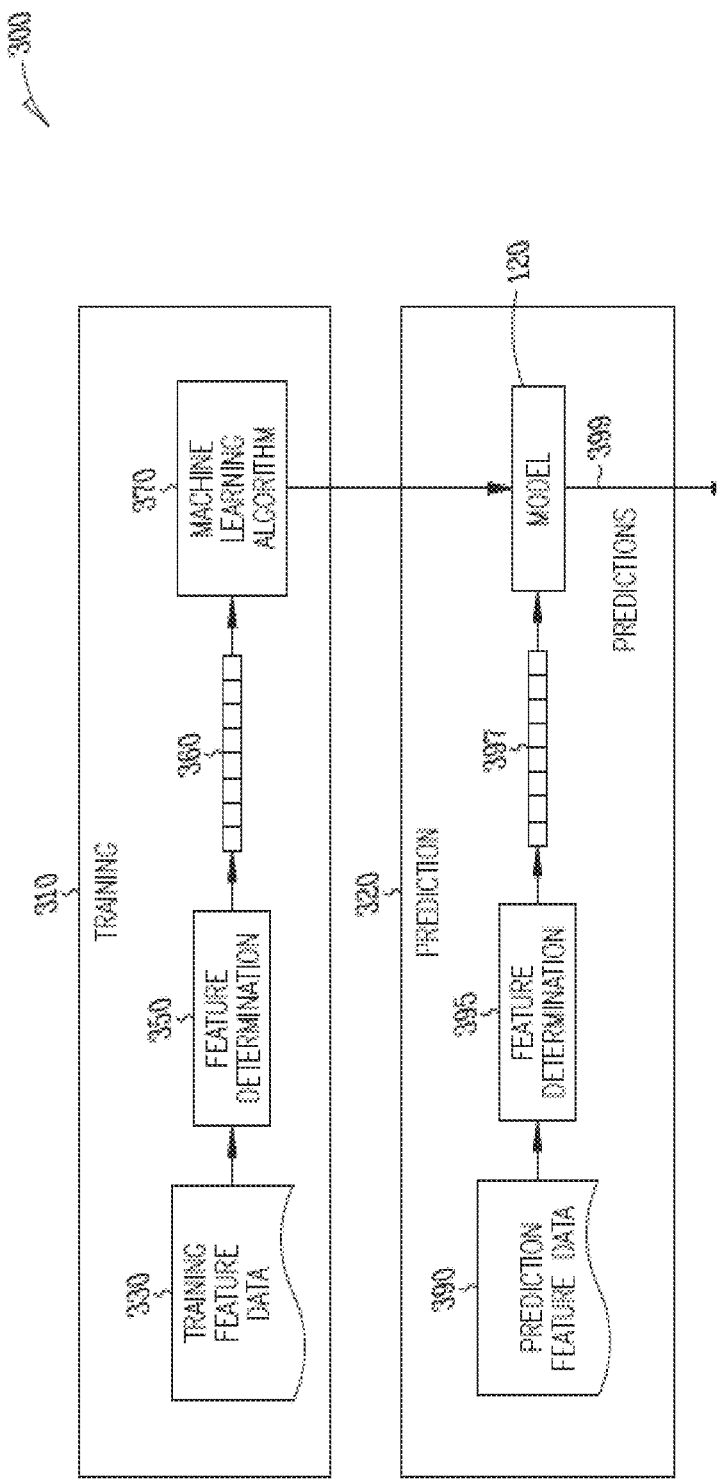
FIG. 3 illustrates an example machine learning module for home lending data control, according to various embodiments.

FIG. 3 shows an example machine learning module 300 according to some examples of the present disclosure. The machine learning module 300 may be implemented in whole or in part by one or more computing devices. In some examples, the training module 310 may be implemented by a different device than the prediction module 320. In these examples, the model 120 may be created on a first machine and then sent to a second machine. In various examples, the machine learning module 300 may be used for one or more of constructing a configuration framework or transforming a format of the data. In various examples, the machine learning module 300 may be generally for a home lending data control product.

Machine learning module 300 utilizes a training module 310 and a prediction module 320. Training module 310 inputs training feature data 330 into feature determination module 350. The training feature data 330 may include data determined to be predictive of one or more of constructing a configuration framework or transforming a format of the data. Categories of training feature data may include financial data, user portfolio data, tracked user data, input user data, news articles, social media data, other third-party data, or the like. Specific training feature data and prediction feature data 390 may include, for example one or more of: current tracked user data, past tracked user data, and the like.

Feature determination module 350 selects training vector 360 from the training feature data 330. The selected data may fill training vector 360 and comprises a set of the training feature data that is determined to be predictive of a data ingestion configuration framework. In some examples, the tasks performed by the feature determination module 350 may be performed by the machine learning algorithm 370 as part of the learning process. Feature determination module 350 may remove one or more features that are not predictive of the data ingestion configuration framework to train the model 120. This may produce a more accurate model that may converge faster. Information chosen for inclusion in the training vector 360 may be all the training feature data 330 or in some examples, may be a subset of all the training feature data 330.

In other examples, the feature determination module 350 may perform one or more data standardization, cleanup, or other tasks such as encoding non numerical features. For example, for categorical feature data, the feature determination module 350 may convert these features to numbers. In some examples, encodings such as "One Hot Encoding" may be used to convert the categorical feature data to numbers. This enables a representation of the categorical variables as binary vectors and provided a "probability-like" number for each label value to give the model more expressive power. One hot encoding represents a category as a vector whereby each possible category value is represented by one element in the vector. When the data is equal to that category value, the value of the vector is a '1' and all other elements are zero (or vice versa).

The training vector 360 may be utilized (along with any applicable labels) by the machine learning algorithm 370 to produce a model 120. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In other examples, machine learning algorithm may be a gradient boosted tree and the model may be one or more data structures that describe the resultant nodes, leaves, edges, and the like of the tree.

In the prediction module 320, prediction feature data 390 may be input to the feature determination module 395. The prediction feature data 390 may include the data described above for the training feature data, but for a specific items such as a data ingestion configuration framework. In some examples, the prediction module 320 may be run sequentially for one or more items. Feature determination module 395 may operate the same, or differently than feature determination module 350. In some examples, feature determination modules 350 and 395 are the same modules or different instances of the same module. Feature determination module 395 produces vector 397, which is input into the model 120 to produce predictions 399. For example, the weightings and/or network structure learned by the training module 310 may be executed on the vector 397 by applying vector 397 to a first layer of the model 120 to produce inputs to a second layer of the model 120, and so on until the prediction 399 is output. As previously noted, other data structures may be used other than a vector (e.g., a matrix).

The training module 310 may operate in an offline manner to train the model 120. The prediction module 320, however, may be designed to operate in an online manner. It should be noted that the model 120 may be periodically updated via additional training and/or user feedback. For example, additional training feature data 330 may be collected. The feedback, along with the prediction feature data 390 corresponding to that feedback, may be used to refine the model by the training module 310.

In some example embodiments, results obtained by the model 120 during operation (e.g., outputs produced by the model in response to inputs) are used to improve the training data, which is then used to generate a newer version of the model. Thus, a feedback loop is formed to use the results obtained by the model to improve the model.

The machine learning algorithm 370 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, gradient boosted tree, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 4:
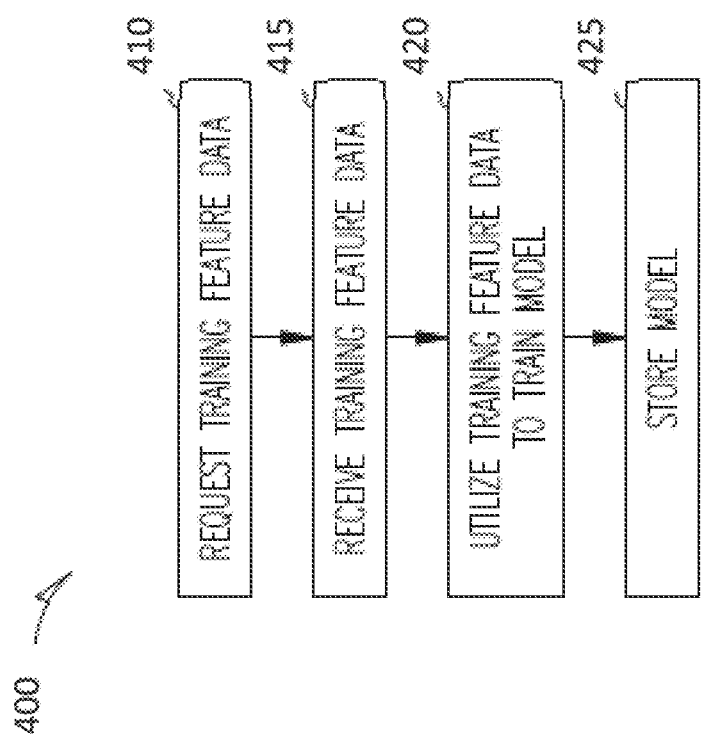
FIG. 4 illustrates a flowchart of a method of training a model for home lending data control, according to various embodiments.

FIG. 4 illustrates a flowchart of a method 400 of training a model for home lending data control, according to various embodiments. At operation 410 the training module (e.g., training module 310 as implemented by a model system) may request training feature data, from one or more systems. At operation 415 the training module may receive the training feature data. The training feature data may be processed using more data standardization, cleanup, or other tasks such as encoding non numerical features (e.g., one hot encoding). At operation 420, the training model may use the training feature data to train the model. For example, by creating a gradient boosted tree, neural network, or the like. At operation 425 the model may be stored in a storage device. In some examples in which the training operations and predictions are done on separate computing devices, the model may be transmitted to a computing device doing predictions. In various examples, the model may be used for one or more of constructing a configuration framework or transforming a format of the data. In various examples, the model may be generally for a home lending data control product.

Figure 5:
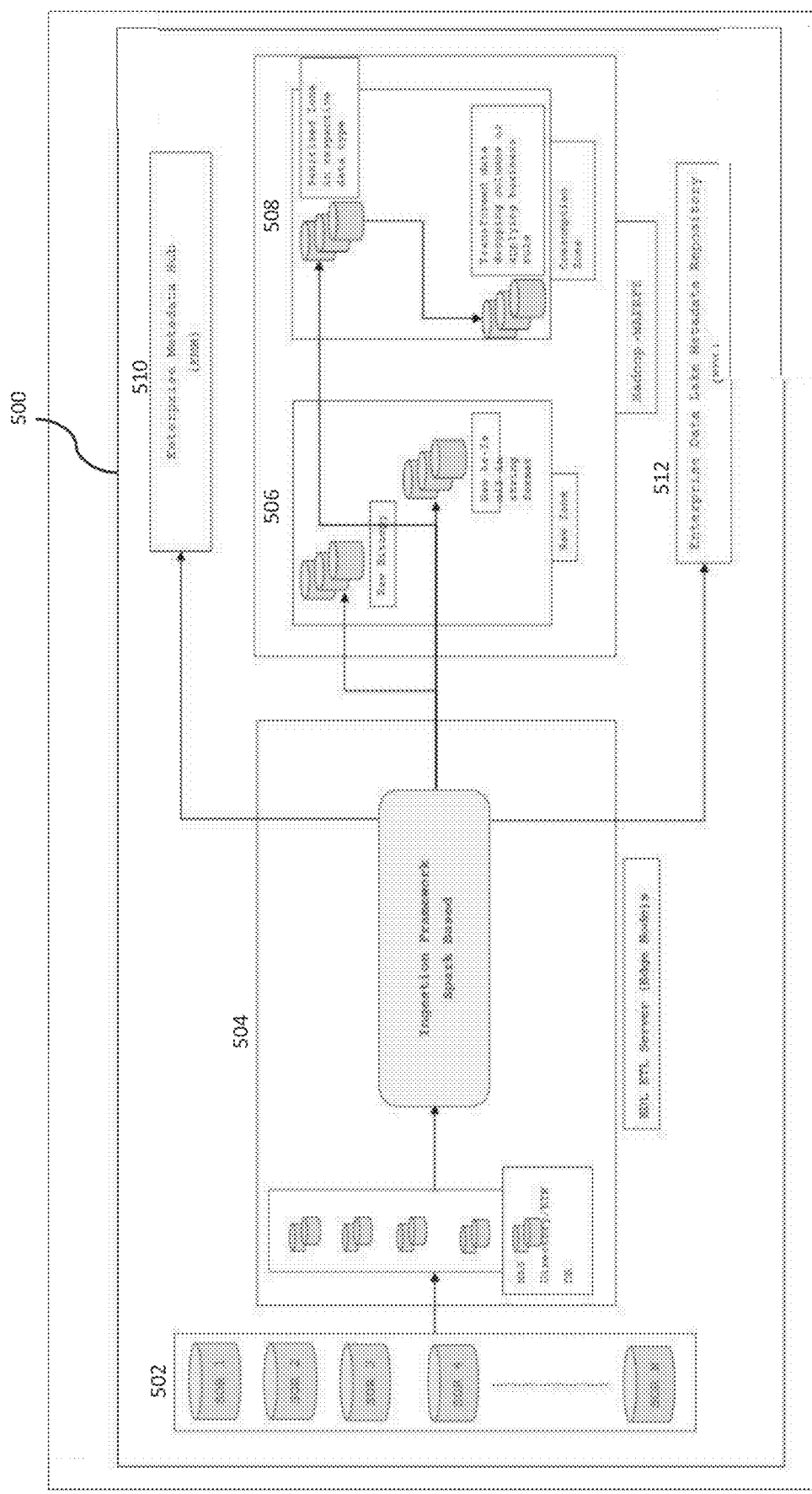
FIGS. 5-7 illustrates example embodiments of a system for home lending data control, according to various embodiments.

FIG. 5 illustrates an example embodiment of a system 500 for home lending data control, according to various embodiments. The system includes a computing system 500 comprising one or more processors and a data storage system in communication with the one or more processors, where the data storage system comprises instructions thereon that, when executed by the one or more processors, causes the one or more processors to receive data from one or more data sources 502. The system is configured to construct a configuration framework 504 for ingesting, conforming and curation of data processing of the received data. The system may be further configured to provide confirmation of receipt and correct format of the data based on the configuration framework, determine that the data has not been modified in transit based on the configuration framework, confirm that the data is from a proper timeframe based on a file header or content of the data, and determine that the data has not been previously processed based on a comparison with previously processed data, in various embodiments. The system is configured to transform a format of the data based on the configuration framework and based on the one or more data sources. The raw data may be stored in a first set of storage locations 506, and the transformed data may be stored in a second set of storage locations 508, in various embodiments. In various examples, data is stored in a data lake or hub 512 configured for centralized processing. The system may further create and store metadata for the data in a repository 512.

Figure 6:
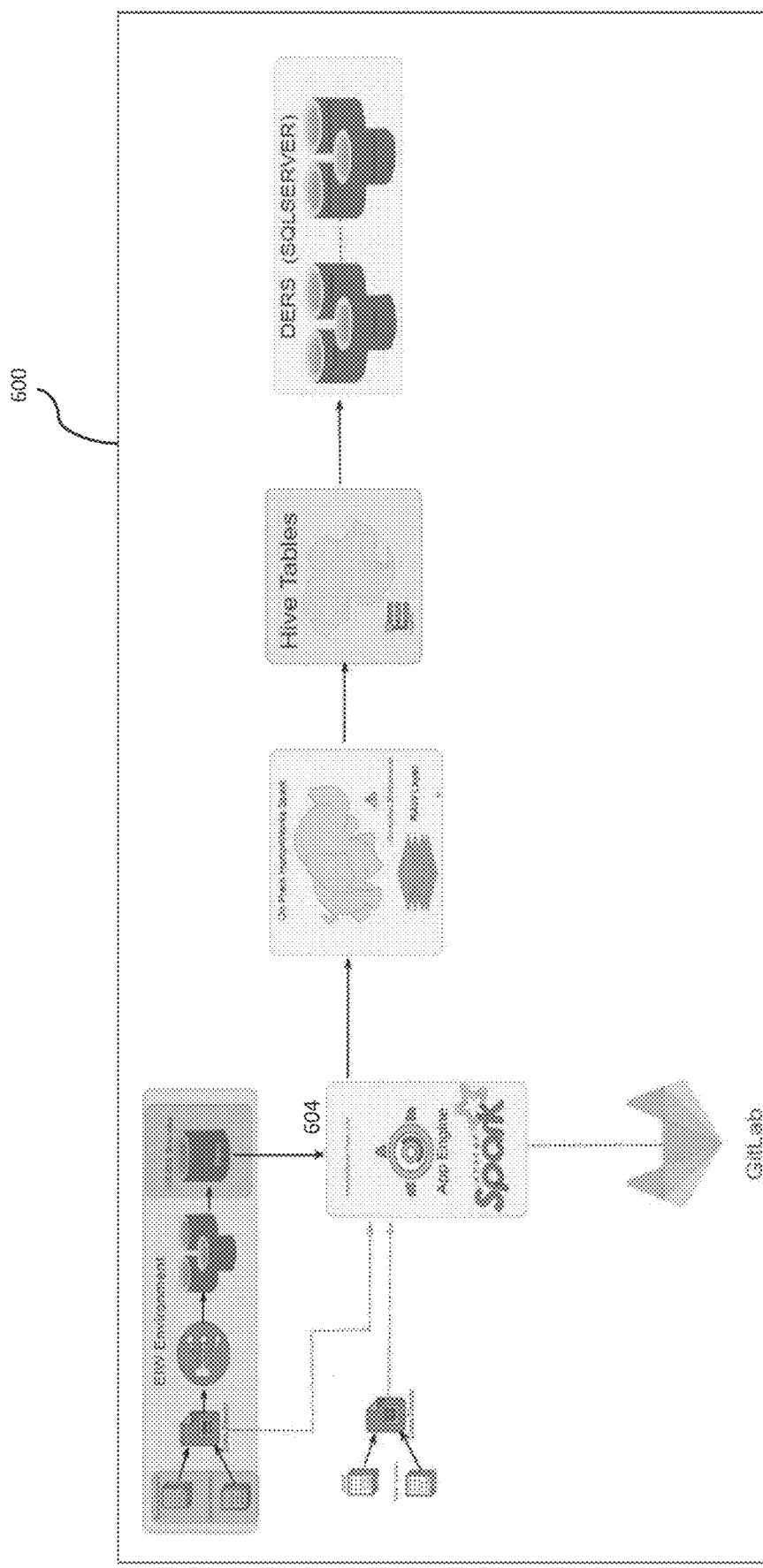

FIG. 6 illustrates a block diagram of a system for home lending data control, according to various embodiments. The system 600 includes a configuration framework 604 for ingesting, conforming and curation of data processing of the received data. The system 600 depicts data flow with flow control, illustrating the various sources used for data extraction and computing and applying validations as per the configuration. The system cleanses the data and validates the data for completeness and conformity, in various examples. Once the data is cleansed and validated, the data is pushed into an Enterprise Data Lake and exposed to business users using hive tables, and further released into an SQL Server database for reporting needs, in various embodiments.

Figure 7:
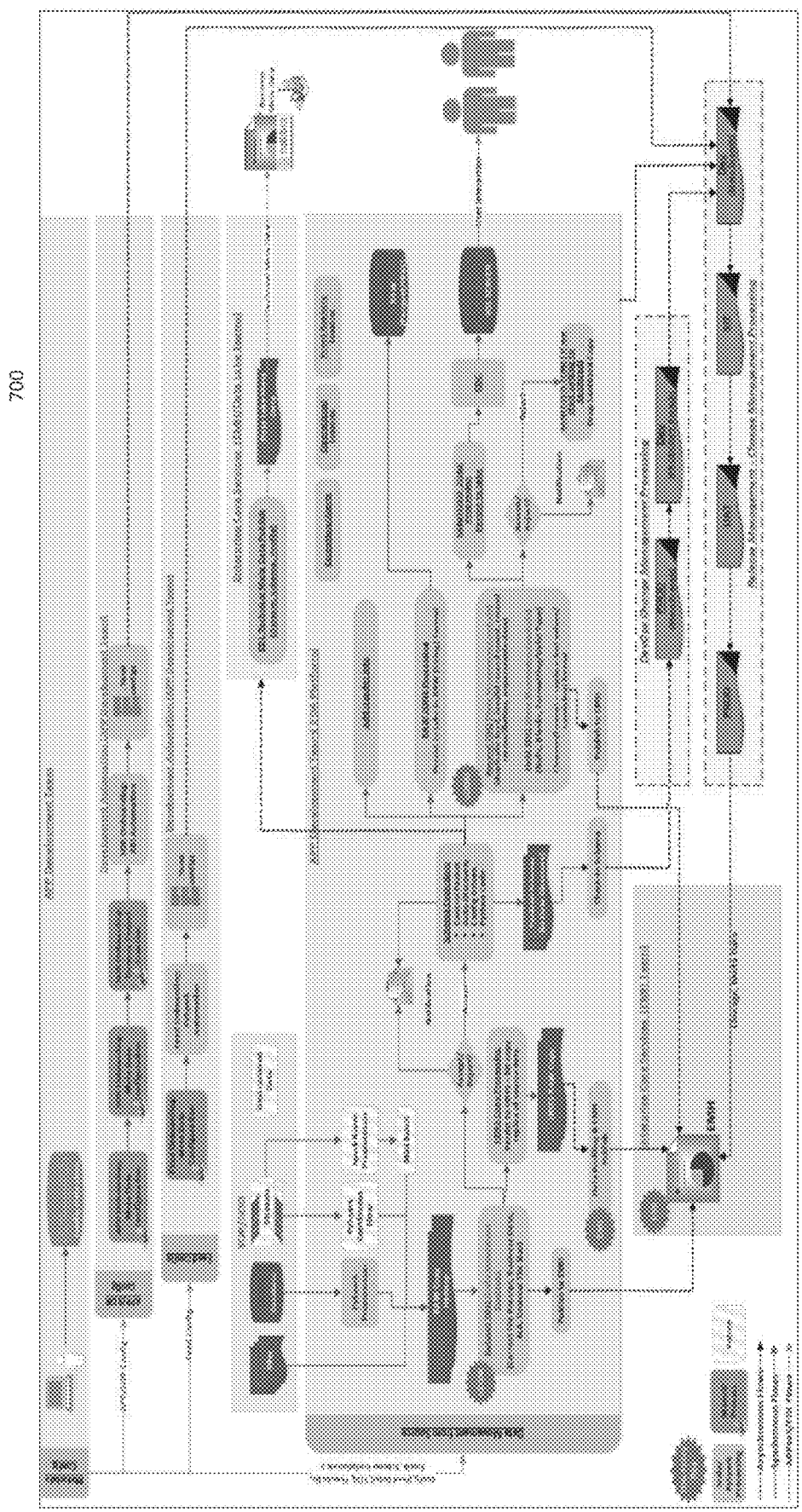

FIG. 7 illustrates a block diagram of a system for home lending data control, according to various embodiments. The system 700 includes details for construction of a configuration framework for ingesting, conforming and curation of data processing of the received data. The system 700 provides an overall architecture used in the present subject matter, and illustrates how the various embodiments are integrated. In various examples, a user may interact with the configurations and build them on an application level and/or on a feed level. Once the configurations are created, a translator may convert them into executable objects and enable different levels of validation, in various embodiments. The system 700 also provides for distributing the resulting data into different zones like raw format in Parquet (or other file format) and sanitized data, for example. The system 700 also provides for automatically harvesting metadata from the configurations and storing the harvested metadata into a repository for lineage and business operations, in various embodiments.

Figure 8:
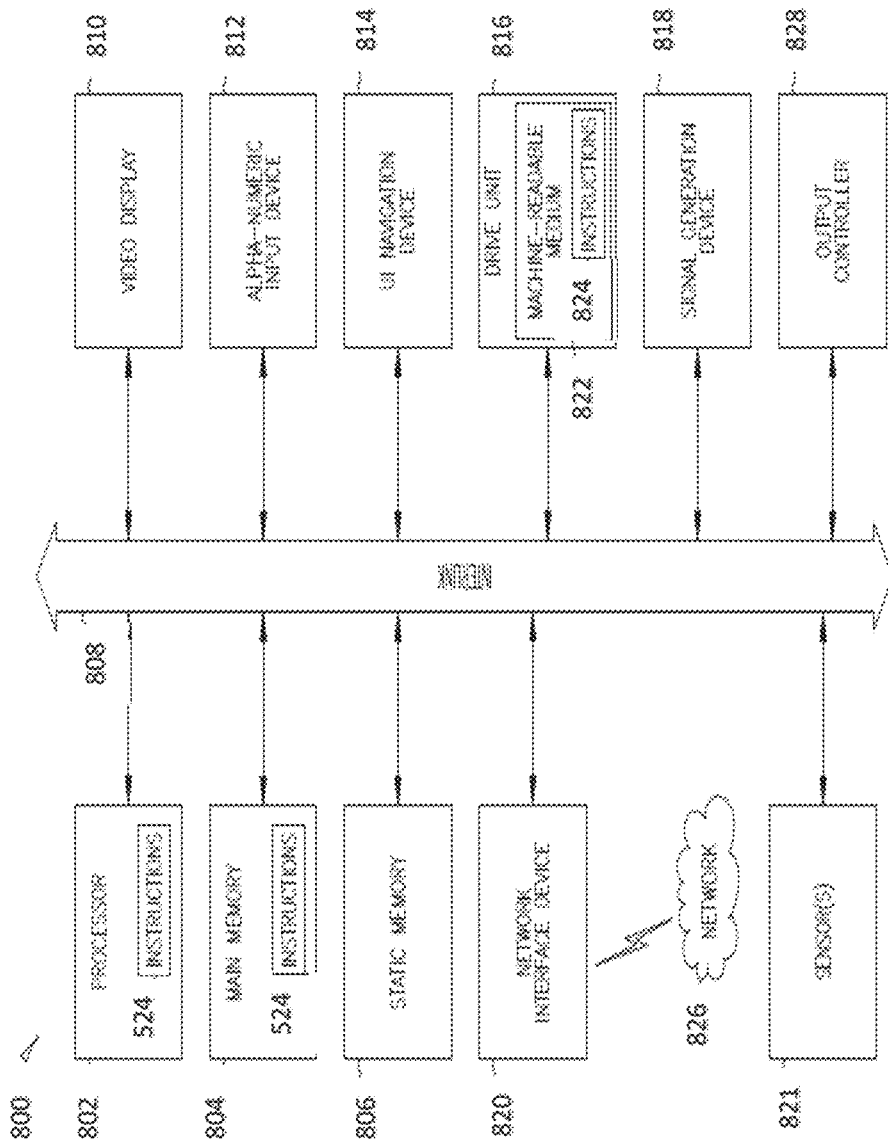
FIG. 8 is a block diagram of a machine in the example form of a computer system within which a set of instructions may be executed, for causing the machine to perform any one or more of the methodologies discussed herein.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may implement one or more of the training and prediction modules 310, 320 (e.g., as software or dedicated hardware) and may be configured to perform the methods of FIGS. 1A, 1B and 4. The machine 800 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a computer-implemented method including receiving, by a computer system, data from one or more data sources, constructing, by the computer system, a configuration framework for ingesting, conforming and curation of data processing of the received data, providing, by the computer system, confirmation of receipt and correct format of the data based on the configuration framework, determining, by the computer system, that the data has not been modified in transit based on the configuration framework, confirming, by the computer system, that the data is from a proper timeframe based on a file header or content of the data, determining, by the computer system, that the data has not been previously processed based on a comparison with previously processed data, transforming, by the computer system, a format of the data based on the configuration framework and based on the one or more data sources, and storing, by the computer system, the data in a data lake configured for centralized processing.

In Example 2, the subject matter of Example 1 optionally includes wherein transforming the format of the data includes loading data from a database table using filters.

In Example 3, the subject matter of Example 1 optionally includes wherein transforming the format of the data includes loading data from a database table and applying multiple data transformation rules.

In Example 4, the subject matter of Example 1 optionally includes wherein transforming the format of the data includes loading data from multiple sources and performing a join operation based at least in part on the configuration framework.

In Example 5, the subject matter of Example 1 optionally includes wherein transforming the format of the data includes masking the data based on a configuration rule and moving the data within different data environments.

In Example 6, the subject matter of Example 1 optionally includes wherein the configuration framework is configured to provide real-time data processing and batch data processing.

In Example 7, the subject matter of Example 1 optionally includes wherein the configuration framework is configured to process multiple data feeds without changes to underlying code.

In Example 8, the subject matter of Example 1 optionally includes wherein the configuration framework is configured to provide extended metadata for processed data.

In Example 9, the subject matter of Example 1 optionally includes wherein the configuration framework is configured to integrate into a plurality of data channels.

Example 10 is a system including: a computing system comprising one or more processors and a data storage system in communication with the one or more processors, wherein the data storage system comprises instructions thereon that, when executed by the one or more processors, causes the one or more processors to: receive data from one or more data sources, construct a configuration framework for ingesting, conforming and curation of data processing of the received data, provide confirmation of receipt and correct format of the data based on the configuration framework, determine that the data has not been modified in transit based on the configuration framework, confirm that the data is from a proper timeframe based on a file header or content of the data, determine that the data has not been previously processed based on a comparison with previously processed data, transform a format of the data based on the configuration framework and based on the one or more data sources, and store the data in a data lake configured for centralized processing.

In Example 11, the subject matter of Example 10 optionally includes wherein transforming a format of the data includes loading data from a database table using filters.

In Example 12, the subject matter of Example 10 optionally includes wherein transforming a format of the data includes loading data from a database table and applying multiple data transformation rules.

In Example 13, the subject matter of Example 10 optionally includes wherein transforming a format of the data includes loading data from multiple sources and performing a join operation based at least in part on the configuration framework.

In Example 14, the subject matter of Example 10 optionally includes wherein one or more of constructing a configuration framework or transforming a format of the data includes using machine learning.

In Example 15, the subject matter of Example 14 optionally includes wherein using machine learning includes using a machine learning model including one or more of a neural network, a long short-term memory (LSTM) network, bidirectional encoder representations from transformers (BERT), natural language processing (NLP), or an artificial intelligence (AI)-based knowledge tree.

Example 16 is a non-transitory computer-readable storage medium, the non-transitory computer-readable storage medium including instructions that, when executed by computers, cause the computers to perform operations of: receiving data from one or more data sources, constructing a configuration framework for ingesting, conforming and curation of data processing of the received data, providing confirmation of receipt and correct format of the data based on the configuration framework, determining that the data has not been modified in transit based on the configuration framework, confirming that the data is from a proper timeframe based on a file header or content of the data, determining that the data has not been previously processed based on a comparison with previously processed data, transforming a format of the data based on the configuration framework and based on the one or more data sources, and storing the data in a data lake configured for centralized processing.

In Example 17, the subject matter of Example 16 optionally includes wherein transforming a format of the data includes loading data from a database table using filters.

In Example 18, the subject matter of Example 16 optionally includes wherein transforming a format of the data includes loading data from a database table and applying multiple data transformation rules.

In Example 19, the subject matter of Example 16 optionally includes wherein transforming a format of the data includes loading data from multiple sources and performing a join operation based at least in part on the configuration framework.

In Example 20, the subject matter of Example 16 optionally includes wherein transforming the format of the data includes masking the data based on a configuration rule and moving the data within different data environments.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   receiving, by a computer system, data from one or more data sources;
   constructing, by the computer system, a configuration framework for ingesting, conforming and curation of data processing of the received data;
   providing, by the computer system, confirmation of receipt and correct format of the data based on the configuration framework;
   determining, by the computer system, that the data has not been modified in transit based on the configuration framework;

confirming, by the computer system, that the data is from a proper timeframe based on a file header or content of the data;

determining, by the computer system, that the data has not been previously processed based on a comparison with previously processed data;

transforming, by the computer system, a format of the data based on the configuration framework and based on the one or more data sources; and storing, by the computer system, the data in a data lake configured for centralized processing.

2. The method of claim 1, wherein transforming the format of the data includes loading data from a database table using filters.

3. The method of claim 1, wherein transforming the format of the data includes loading data from a database table and applying multiple data transformation rules.

4. The method of claim 1, wherein transforming the format of the data includes loading data from multiple sources and performing a join operation based at least in part on the configuration framework.

5. The method of claim 1, wherein transforming the format of the data includes masking the data based on a configuration rule and moving the data within different data environments.

6. The method of claim 1, wherein the configuration framework is configured to provide real-time data processing and batch data processing.

7. The method of claim 1, wherein the configuration framework is configured to process multiple data feeds without changes to underlying code.

8. The method of claim 1, wherein the configuration framework is configured to provide extended metadata for processed data.

9. The method of claim 1, wherein the configuration framework is configured to integrate into a plurality of data channels.

10. A system comprising:
a computing system comprising one or more processors and a data storage system in communication with the one or more processors, wherein the data storage system comprises instructions thereon that, when executed by the one or more processors, causes the one or more processors to:

receive data from one or more data sources;

construct a configuration framework for ingesting, conforming and curation of data processing of the received data;

provide confirmation of receipt and correct format of the data based on the configuration framework;

determine that the data has not been modified in transit based on the configuration framework;

confirm that the data is from a proper timeframe based on a file header or content of the data;

determine that the data has not been previously processed based on a comparison with previously processed data;

transform a format of the data based on the configuration framework and based on the one or more data sources; and store the data in a data lake configured for centralized processing.

11. The system of claim 10, wherein transforming a format of the data includes loading data from a database table using filters.

12. The system of claim 10, wherein transforming a format of the data includes loading data from a database table and applying multiple data transformation rules.

13. The system of claim 10, wherein transforming a format of the data includes loading data from multiple sources and performing a join operation based at least in part on the configuration framework.

14. The system of claim 10, wherein one or more of constructing a configuration framework or transforming a format of the data includes using machine learning.

15. The system of claim 14, wherein using machine learning includes using a machine learning model including one or more of a neural network, a long short-term memory (LSTM) network, bidirectional encoder representations from transformers (BERT), natural language processing (NLP), or an artificial intelligence (AI)-based knowledge tree.

16. A non-transitory computer-readable storage medium, the non-transitory computer-readable storage medium including instructions that, when executed by computers, cause the computers to perform operations of:

receiving data from one or more data sources;

constructing a configuration framework for ingesting, conforming and curation of data processing of the received data;

providing confirmation of receipt and correct format of the data based on the configuration framework;

determining that the data has not been modified in transit based on the configuration framework;

confirming that the data is from a proper timeframe based on a file header or content of the data;

determining that the data has not been previously processed based on a comparison with previously processed data;

transforming a format of the data based on the configuration framework and based on the one or more data sources; and storing the data in a data lake configured for centralized processing.

17. The non-transitory computer-readable storage medium of claim 16, wherein transforming a format of the data includes loading data from a database table using filters.

18. The non-transitory computer-readable storage medium of claim 16, wherein transforming a format of the data includes loading data from a database table and applying multiple data transformation rules.

19. The non-transitory computer-readable storage medium of claim 16, wherein transforming a format of the data includes loading data from multiple sources and performing a join operation based at least in part on the configuration framework.

20. The non-transitory computer-readable storage medium of claim 16, wherein transforming the format of the data includes masking the data based on a configuration rule and moving the data within different data environments.

* * * * *